United States Patent
Zonfrilli et al.

(10) Patent No.: US 10,706,529 B2
(45) Date of Patent: Jul. 7, 2020

(54) METHOD AND DEVICE FOR HOLISTIC EVALUATION OF SUBTLE IRREGULARITIES IN A DIGITAL IMAGE

(71) Applicant: The Procter & Gamble Company, Cincinnati, OH (US)

(72) Inventors: Fabio Zonfrilli, Brussels (BE); Qi Zhang, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 102 days.

(21) Appl. No.: 16/001,974

(22) Filed: Jun. 7, 2018

(65) Prior Publication Data

US 2018/0357759 A1 Dec. 13, 2018

(30) Foreign Application Priority Data

Jun. 8, 2017 (WO) ................ PCT/CN2017/087539

(51) Int. Cl.
*G06T 7/00* (2017.01)
*G06T 7/12* (2017.01)
(Continued)

(52) U.S. Cl.
CPC ............ *G06T 7/0008* (2013.01); *G06T 7/001* (2013.01); *G06T 7/0004* (2013.01); *G06T 7/12* (2017.01);
(Continued)

(58) Field of Classification Search
CPC ........... G06T 7/0008; G06T 7/62; G06T 7/12; G06T 7/194; G06T 7/90; G06T 7/0004;
(Continued)

(56) References Cited

U.S. PATENT DOCUMENTS

| | | | |
|---|---|---|---|
| 5,260,154 A | 11/1993 | Forrest | |
| 5,414,778 A | 5/1995 | Schwartz | |

(Continued)

FOREIGN PATENT DOCUMENTS

| | | |
|---|---|---|
| CN | 102034107 | 4/2011 |
| CN | 105046681 | 11/2015 |
| CN | 106506901 | 3/2017 |

OTHER PUBLICATIONS

2. Karami et al., "A novel image analysis approach for evaluation of mixing uniformity in drug-filled silicone rubber matrix", International Journal of Pharmaceutics 460 (2014) 158-164.

(Continued)

*Primary Examiner* — Leon Viet Q Nguyen

(74) *Attorney, Agent, or Firm* — Gary J. Foose

(57) ABSTRACT

Digital image processing device and method for holistic evaluation of subtle irregularities in a digital image by using the scale space technique to identify irregularities of interest and by calculating a total irregularity score using a function of intensity, scale and optionally location of the identified irregularities of interest. Specifically, the digital image represents a liquid mixture formed by mixing two or more liquid compositions of different ingredients, colors, viscosities, and/or solubility; the subtle irregularities represent non-homogenous mixing spots or regions in such liquid mixture.

14 Claims, 6 Drawing Sheets

(51) Int. Cl.
*G06T 7/90* (2017.01)
*G06T 7/62* (2017.01)
*G06T 7/194* (2017.01)
*G06T 7/40* (2017.01)

(52) U.S. Cl.
CPC ............... *G06T 7/194* (2017.01); *G06T 7/40* (2013.01); *G06T 7/62* (2017.01); *G06T 7/90* (2017.01); *G06T 2207/10024* (2013.01); *G06T 2207/20016* (2013.01)

(58) Field of Classification Search
CPC ... G06T 7/001; G06T 7/40; G06T 2207/1024; G06T 2207/20016
See application file for complete search history.

(56) References Cited

U.S. PATENT DOCUMENTS

| | | | | |
|---|---|---|---|---|
| 2004/0101204 A1* | 5/2004 | King | | G06T 9/20 |
| | | | | 382/243 |
| 2014/0085324 A1* | 3/2014 | Charvet | | G06T 7/0004 |
| | | | | 345/589 |
| 2018/0276885 A1* | 9/2018 | Singh | | G06T 17/20 |

OTHER PUBLICATIONS

4. Van der Mijnsbrugge et al., "Image analysis of dough development: Impact of mixing parameters and wheat cultivar on the gluten phase distribution", Journal of Food Engineering 171 (2016) 102-110.

AA1232F Search Report for PCT application No. PCT/CN2017/087539, dated Feb, 24, 2018, 5 pages.

Alvarado et al., "An Image Analysis Method for the Measurement of Mixing Times in Stirred Vessels", Chemical and Engineering Technology 34 (2011), No. 6, 859-866.

Juez et al., "Monitoring of Concrete Mixing Evolution Using Image Analysis", Powder Technology 305 (2017) 477-487.

Li et al., "Three-Dimensional Image Analysis of Mixing in Stirred Vessels", AIChE Journal, vol. 45, No. 9 (Sep. 1999) 1855-1865.

Lindeberg, "Feature Detection with Automatic Scale Selection," International Journal of Computer Vision 30(2) (1998) 79-116.

Lowe, "Distinctive Image Features from Scale-Invariant Keypoints", International Journal of Computer Vision (2004) 1-28.

Decombas, Marc et al.—A New Object Based Quality Metric Based on SIFT and SSIM, International Conference on IEEE, Sep. 30, 2012, 4 pages.

Mualla, Firas and Latakia, Syrien—"Automatic Unstained Cell Detection in Bright Field Microscopy" Abstract, https://www5.informatik.uni-erlangen.de/Forschung/Publikationen/2016/Mualla16-AUC.pdf, retrieved on Aug. 29, 2019, 156 pages.

Supplementary International Search Report for International Application No. PCT/CN2017/087539, dated Sep. 12, 2019, 10 pages.

Verma, Abhishek and Liu, Chengjun—"SIFT Features in Multiple Color Spaces for Improved Image Classification", Springer International Publishing AG, Apr. 19, 2017, 22 pages.

Wu, Yen-Ju and Tsai, Chun-Ming—"Improving Leaf Classification Rate via Background Removal and ROI Extraction", Journal of Image and Graphics, vol. 4, No. 2, Dec. 2016, 6 pages.

\* cited by examiner

METHOD AND DEVICE FOR HOLISTIC EVALUATION OF SUBTLE IRREGULARITIES IN A DIGITAL IMAGE

FIELD OF THE INVENTION

The present disclosure relates to digital image processing method and device for holistic evaluation of subtle irregularities in a digital image. More specifically, the present disclosure relates to digital image processing method and device for detection and measurement of subtle, non-homogeneous mixing spots or regions in a liquid mixture that is formed by two or more liquid compositions of different ingredients, colors, viscosities, and/or solubility (e.g., hydrophobicity or hydrophilicity).

BACKGROUND OF THE INVENTION

In certain industries, e.g., cosmetics or laundry detergents, it is necessary to mix two or more different liquid compositions together to form a finished liquid product. Such two or more liquid compositions to be mixed may contain very different ingredients and may be characterized by different colors, viscosities, and/or solubility. Depending on the mixing equipment and methods employed, it is possible that the mixing of such liquid compositions may not be carried out thoroughly. Correspondingly, the resulting finished liquid product may not be completely homogeneous, i.e., it may contain non-homogeneous spots or regions where the local characteristics are different from the rest of the product.

In order to understand the effectiveness of the mixing equipment and process, it is important to be able to objectively and quantitatively evaluate the in situ presence, severity and size of these non-homogeneous spots or regions in the finished liquid product. However, challenges lie in the fact that although some of these non-homogeneous spots or regions may be readily visible to human eyes, e.g., with different colors or solubility, others may be very subtle or even invisible, e.g., different only in ingredients or viscosities. Further, such non-homogenous spots or regions may not be discrete but rather gradual and subtle, which increases the difficulty in evaluating and quantifying them. Still further, when such non-homogenous spots or regions are formed when the finished liquid product has already been placed into its primary package, it is even more difficult to evaluate them through the primary package, e.g., a bottle (but taking the finished liquid product out of the bottle may disturb the non-homogeneity and defeat the purpose of in situ measurement).

Various image processing techniques have been previously employed to evaluate the mixing results of a garden variety of solid and/or liquid materials.

For example, Juez et al., "Monitoring of Concrete Mixing Evolution Using Image Analysis", Powder Technology 305 (2017) 477-487 describes the use of an overall image histogram elaboration method to conduct inline monitoring of concrete mixing, especially the granulation and wet agglomeration of concrete. This method provides good results for images that are relatively uniform with little or no change in the overall luminosity. However, it does not work well when the luminosity and/or color variations are very high, as for some liquid mixtures formed by liquid compositions of different colors and/or solubility. The high luminosity and/or color variations generate "noises" that may mask non-homogeneous mixing results in some situations, but in other situations may incorrectly flag out homogenously mixed product. Even when a perfectly mixed product is provided, image of the bottle containing such product may not have a homogeneous histogram distribution and may result in an erroneously high non-homogeneity score.

For another example, Karami et al., "A Novel Image Analysis Approach for Evaluation of Mixing Uniformity in Drug-Filled Silicone Rubber Matrix", International Journal of Pharmaceutics 460 (2014) 158-164 describes the use of image segmentation techniques for identifying and extracting discrete drug particles from digital images of drug formulations containing the same. The image segmentation techniques are more robust against environment fluctuations and background noises, in comparison with the overall image histogram elaboration technique mentioned hereinabove. However, such image segmentation method requires a sufficiently strong color or luminosity contrast between the particles to be identified and the background, and it therefore may not work well for identifying subtle and gradual changes in color and luminosity, which are typically seen in the non-homogenously mixed liquid products of interest to this invention.

There is therefore a need for an objective and quantitative image processing method for holistically evaluating and measuring the homogeneity and/or non-homogeneity of liquid products that are formed by mixing of two or more different liquid compositions, i.e., wellness of mixing.

It is desirable that such method is robust against overall color/luminosity fluctuations from image to image and background noises. It is also desirable that such method can effectively identify subtle irregularities and gradual changes in color and luminosity.

It is further advantageous if such method enables an unsupervised automated analysis that does not require a control or reference image.

SUMMARY OF THE INVENTION

The present disclosure employs scale space image analysis technique to identify subtle irregularities or discontinuity in a digital image of a non-homogeneously mixed liquid product and then uses a global rating procedure to yield a single quantitative score for aiding holistic and objective evaluation of the wellness of mixing in such product. This approach is resistant to overall luminosity variations but does not require discrete particle segmentation. It is able to find and measure subtle irregularities in the digital image, which, in the context of liquid mixtures, are indicative of spots or regions where mixing has not been carried out thoroughly.

The present disclosure relates to a method operational in an image processing device for evaluating irregularities of interest in a digital image, including the following steps:
  (a) receiving a digital image that potentially comprises irregularities of interest;
  (b) extracting an area of interest from such digital image by removing background areas;
  (c) conducting scale space analysis of the extracted area of interest to identify extrema each representing a local maximum or minimum, wherein each extremum has a specific intensity and is of a specific scale;
  (d) selecting extrema having intensities above a minimal threshold value from the identified extrema and recording such as irregularities of interest;
  (e) calculating a total irregularity score using a function of the intensities and scales of all recorded irregularities of interest; and
  (f) evaluating irregularities of interest in the digital image using the calculated total irregularity score.

Preferably, the digital image is the image of a liquid mixture contained in a rigid transparent or translucent container of a specific shape, e.g., a bottle, a box, a carton, a jar, etc. Such liquid mixture is formed by two or more different liquid compositions (differing in colors, viscosities, and/or hydrophobicity/hydrophilicity), and the irregularities of interest are non-homogeneously mixed spots or regions in such mixtures.

The total irregularity score may be calculated using function (1):

$$\text{Score} = \sum_{i=1}^{n} f(Intensity_i, Scale_i) \tag{1}$$

while i refers to each of the recorded irregularities of interest; and n refers to the total number of recorded irregularities of interest i.

Further, the total irregularity score may be calculated using function (2):

$$\text{Score} = \sum_{i=1}^{n} f(Intensity_i, Scale_i, Location_i) \tag{2}$$

while i refers to each of the recorded irregularities of interest; and n refers to the total number of recorded irregularities of interest i.

Preferably during step (b), the background areas are removed and the area of interest is extracted by using an edge identification method, which preferably comprises the steps of first applying a Sobel edge filter to the image, then thresholding, and followed by contour detection and selection.

Preferably during step (c), the scale space analysis includes the following steps:
(i) convoluting the extracted area of interest with a Gaussian kernel to build a multi-scale representation of the extracted area of interest that comprises a series of derivative images of the extracted area of interest, each being more blurred than a preceding image and each being separated from the preceding image by a constant factor in scale space;
(ii) computing the difference of Gaussian (DoG) between each two consecutive derivative images of the extracted area of interest from step (i); and
(iii) identifying extrema having a local maximal or minimal of DoG, while the intensity of each extremum is its absolute DoG value, and while the scale of each extremum is its size.

More preferably, the total irregularity score can be calculated using function (3):

$$\text{Score} = \frac{\sum_{i=1}^{n}(|DoG_i| \times \pi \times R_i^2)}{W \times H} \tag{3}$$

while i refers to each of the recorded irregularities of interest; n refers to the total number of recorded irregularities of interest i; $R_i$ refers to the radius of each of the recorded irregularities of interest i; W refers to the width of the extracted area of interest; and H refers to the height of the extracted area of interest.

The digital image in the present disclosure can be a colored image in the visible spectrum. The colored image may be first converted to grayscale before the area extraction in step (b), and while the intensity of each identified extremum is its grayscale intensity.

It may be that no greyscale conversion is applied, and the area extraction in step (b) and the scale space analysis in step (c) are conducted on the colored image in each color channel of a color model selected from the group consisting of RGB, CYMK, HSL, and HSV, while the total irregularity score is calculated using a function of intensities, scales and locations of all recorded irregularities of interest in all color channels of said color model or space. Preferably, the selected color model is RGB, and the total irregularity score is correspondingly calculated using function (4):

$$\text{Score} = \sum_{i=1}^{n} f_{Red}(IT_i^R, SL_i^R, LC_i^R) + \tag{4}$$

$$\sum_{j=1}^{m} f_{Green}(IT_j^G, SL_j^G, LC_j^G) + \sum_{k=1}^{l} f_{Blue}(IT_l^B, SL_l^B, LC_l^B)$$

while i refers to the recorded irregularities of interest in the red channel; n refers to the total number of recorded irregularities of interest i in the red channel; j refers to the recorded irregularities of interest in the green channel; m refers to the total number of recorded irregularities of interest j in the green channel; k refers to the recorded irregularities of interest in the blue channel; l refers to the total number of recorded irregularities of interest k in the blue channel; IT refers to the color intensity of each recorded irregularity of interest in the respective color channel; SL refers to the scale of each recorded irregularity of interest in the respective color channel; and LC refers to the location of each recorded irregularity of interest in the respective color channel.

In a particularly preferred, but not necessary, embodiment of the present disclosure, calculation of the total irregularity score eliminates contributions from:
(i) selected extrema of a predetermined shape and/or size; and/or
(ii) selected extrema that are also present in a baseline image.

The present disclosure relates to a non-transitory processor-readable medium having stored thereon instructions which when executed by a computing device or system cause said computing device or system to perform the method as described hereinabove.

The present disclosure relates to a computer program or computer program product including instructions which when executed by a computing device or system cause said computing device or system to perform the method as described hereinabove.

The present disclosure relates to a data stream which is representative of the computer program or computer program product as described hereinabove.

The present disclosure relates to an image processing device for evaluating irregularities of interest in a digital image, containing:
(a) an image input unit configured to receive a digital image that potentially comprises irregularities of interest;
(b) an image extraction unit configured to extract an area of interest from said digital image by removing background areas;

(c) a scale space analysis unit configured to conduct scale space analysis of the extracted area of interest and to identify extrema each representing a local maximum or minimum, wherein each extremum has a specific intensity and is of a specific scale;

(d) an irregularity selection unit configured to select extrema of a minimal intensity from the identified extrema and to record such as irregularities of interest;

(e) an irregularity score calculating unit configured to calculate a total irregularity score using a function of the intensities and scales of all recorded irregularities of interest; and (f) an output unit for outing the calculated total irregularity score for use in evaluation of irregularities of interest in the digital image.

These and other aspects of the present disclosure will become more apparent upon reading the following detailed description of the disclosure.

BRIEF DESCRIPTION OF THE DRAWINGS

FIG. 3A is a digital image of a transparent bottle (with a handle) that is partially filled by a liquid mixture, while

FIG. 3C is a digital image of another transparent bottle (handleless) that is partially filled by a liquid mixture, while

DETAILED DESCRIPTION OF THE INVENTION

Figure 1:
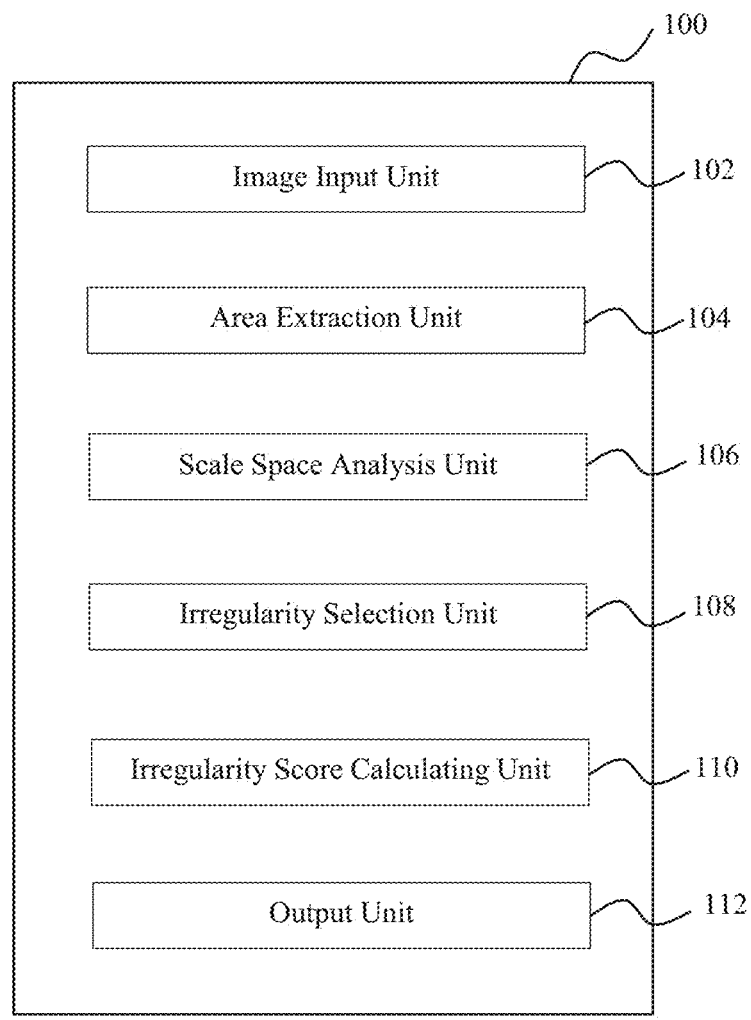
FIG. 1 is a schematic block diagram illustrating an image processing device for evaluating irregularities of interest in a digital image, in accordance with an embodiment of the present invention.

Exemplary embodiments of the present disclosure will be described in detail hereinafter with reference to the accompanying drawings. While the present disclosure is shown and described in connection with exemplary embodiments thereof, it will be apparent to those skilled in the art that various modifications can be made without departing from the spirit and scope of the invention. Although terms to designate components in this specification are selected from generally and widely used terms in consideration of the function of the component in the present invention, the meaning of the term may be changed to convey the intention of those skilled in the art to which the present invention pertains or the customary meaning or adapt to the advent of new technology. In addition, in some cases, terms may be randomly selected by applicants while stating the meaning of the term in the corresponding part of the specification of the present invention. Accordingly, it will be understood that terms used in this specification should be construed based on the substantial meaning of the term and the overall context in the specification, instead of being construed only as a name of the component. Certain well-known functions or constitutions will not be described in detail if they would obscure the invention in unnecessary detail.

The ensuring disclosure focuses on image processing method and device as applied to evaluation of liquid consumer products (e.g., a liquid laundry detergent, a liquid fabric care enhancer, a liquid dish-wash detergent, a liquid hard-surface cleaner, a liquid air freshener, a shampoo, a conditioner, a liquid body-wash, a liquid hand soap, a liquid facial cleanser, a liquid facial toner, a moisturizer, and the like), especially liquid laundry detergent products. Such liquid consumer products are formed by mixing multiple liquid raw materials of different colors, density, viscosity, and solubility in large quantities (e.g., through batch mixing, or continuous in-line mixing, or in situ mixing directly inside a container that is designated for housing the finished liquid consumer product during shipping and commercialization, or even during usage after such product is sold). The liquid consumer products so formed (especially those by in situ mixing) may contain one or more regions that are not homogenously mixed, which may result in regional phase separation, discoloration, gelling, or coagulation of the products that may in turn adversely affect the product performance.

Therefore, a key object of this disclosure is to qualitatively determine the scale and severity of such non-homogeneously mixed regions in the liquid consumer products, by analyzing digital images of the above-mentioned liquid consumer products, especially liquid laundry detergent products, as contained in transparent or translucent bottles or other containers.

However, application of the image processing method and device of the present disclosure should not be so limited, but should broadly extend to any liquid mixtures that are not homogeneously mixed, or even to any image that contains subtle and gradual irregularities of interest that need to be evaluated holistically using a single quantitative score.

Liquid Consumer Products to be Analyzed

Suitable liquid consumer product compositions that can be analyzed by the method of the present invention may include, but are not limited to, compositions for treating hair (human, dog, and/or cat), including bleaching, coloring, dyeing, conditioning, growing, removing, retarding growth, shampooing, and/or styling; deodorants and antiperspirants; personal cleansing; color cosmetics; products, and/or methods relating to treating skin (human, dog, and/or cat), including application of creams, lotions, and other topically applied products for consumer use; products and/or methods relating to orally administered materials for enhancing the appearance of hair, skin, and/or nails (human, dog, and/or cat); shaving; body sprays; fine fragrances like colognes and perfumes; compositions for treating fabrics, hard surfaces and any other surfaces in the area of fabric and home care, including air care, car care, dishwashing, fabric conditioning (including softening), laundry detergency, laundry and rinse additive and/or care, hard surface cleaning and/or treatment, and other cleaning for consumer or institutional use; hand soaps, shampoos, lotions, oral care compositions, such as toothpaste and/or tooth whitening compositions.

The liquid consumer product compositions of the present invention may be fabric care compositions, hard surface cleaning compositions, dishwashing compositions, air care compositions, and/or hair care compositions, more preferably a fabric care composition, a hard surface cleaning composition, a dishwashing composition, and/or an air care composition. The composition may be a fabric care composition. The fabric care composition may be a laundry detergent, a fabric enhancing composition, or a mixture thereof. The fabric care composition may be a laundry detergent, such as a heavy-duty liquid laundry detergent.

The liquid consumer product compositions of the present invention may have any flowable form. The composition may be in a liquid form selected from a liquid, a gel, a paste, or a unit dose article (single- or multi-compartmented) containing any of the above, or combinations thereof. The compositions may be preferably liquid or gel, and more preferably liquid. The composition may be a heavy-duty liquid laundry detergent, a liquid fabric enhancing composition, or combinations thereof, and preferably a heavy-duty liquid laundry detergent.

The compositions of the present invention may be in a form selected from the group consisting of a liquid laundry detergent, a gel detergent, a single-phase or multi-phase unit dose detergent, a detergent contained in a single-phase or multi-phase or multi-compartment water soluble pouch, a liquid hand dishwashing composition, a liquid laundry pretreat product, a liquid fabric softener composition, and mixtures thereof.

The liquid consumer product compositions of the present invention may have a viscosity of from about 1 to about 2000 mPa*s at 25° C. and a shear rate of 20 sec$^{-1}$. The viscosity of the liquid may be in the range of from about 200 to about 1000 mPa*s at 25° C. at a shear rate of 20 sec$^{-1}$. The viscosity of the liquid may be in the range of from about 200 to about 500 mPa*s at 25° C. at a shear rate of 20 sec$^{-1}$.

The liquid consumer product compositions of the present invention may comprise a variety of suitable active ingredients, such as surfactants (anionic surfactants, nonionic surfactants, cationic surfactants, zwitterionic surfactants, amphoteric surfactants), emulsifiers, polymeric compounds, enzymes, enzyme stabilizers, bleach, bleach activators, brighteners, hueing agents, colorants (e.g., dyes or pigments), opacifiers, pearlescent agents, chelating agents, suds suppressors, conditioning agents, emollients, humectants, perfumes, perfume microcapsules, pH controllers, buffers, and the like. Further, the composition may comprise a variety of adjunct ingredients, such as carriers, fillers, builders, solvents (which may be water and/or an organic solvent), structurants, thickeners, and the like.

The liquid consumer product compositions of the present invention may include one or more non-homogeneous regions. The non-homogeneity of such compositions may result from combining adjunct ingredients to a base composition late in the manufacturing process and/or minimal purposeful mixing, e.g., without dedicated static or dynamic mixing equipment. The base composition and adjunct may be combined in the final product container or in a nozzle immediately prior to filling the final product container.

Scale Space Digital Image Analysis

Following are the key steps in the scale space digital image processing method of the present invention:

1. Extracting an area of interest from a digital image to be analyzed by excluding background areas. Specifically, when the digital image is the image of a transparent or translucent bottle that is partially filled by a liquid mixture, only the section containing the liquid mixture should be extracted, while the background areas outside of the bottle as well as the section of the bottle that does not contain the liquid mixture need to be excluded.

2. Conducting scale space analysis of the extracted area of interest to detect points of interest, i.e., extrema that each represents a local maximum or minimum, and to provide at least an intensity value and a size or scale for each point of interest. In the context of liquid mixtures, any of such points of interest with a sufficiently high intensity and/or a sufficiently large size is indicative of a significant local irregularity, i.e., evidence of poor mixing. Therefore, by selecting extrema having intensities and/or scales that are above a minimal threshold value, areas of significant local irregularities indicative of poor mixing can be readily and effectively detected.

3. Calculating a total irregularity score by summing up contributions from all local irregularities so detected. In the context of liquid mixtures, such a total irregularity score functions as a single quantitative measure for how good the mixing is, irrespective of color and luminosity variations in the liquid mixtures. This single quantitative measure allows objective comparison across liquid mixtures of different colors under very different luminosity conditions.

Hereinafter, exemplary embodiments of the present invention will be described in detail with reference to the accompanying drawings.

FIG. 1 is a schematic block diagram illustrating an image processing device for evaluating irregularities of interest in a digital image, in accordance with an embodiment of the present invention. The image processing device 100 of the present invention may include an image input unit 102 configured to receive a digital image that potentially contains one or more irregularities of interest, an image extraction unit 104 configured to extract an area of interest from said image by removing background areas, a scale space analysis unit 106 configured to conduct scale space analysis of the extracted area of interest and to identify local extrema (i.e., each local extrema represents a local maximum or minimum and has a specific intensity and a specific scale/size), an irregularity selection unit 108 configured to select extrema of a minimal intensity from the identified extrema and to record such as irregularities of interest, an irregularity score calculating unit 110 configured to calculate a total irregularity score based on a function of the intensities and scales of all recorded irregularities of interest, and an output unit for outing the calculated total irregularity score, which is subsequently used to evaluate irregularities of interest in the received digital image.

Figure 2:
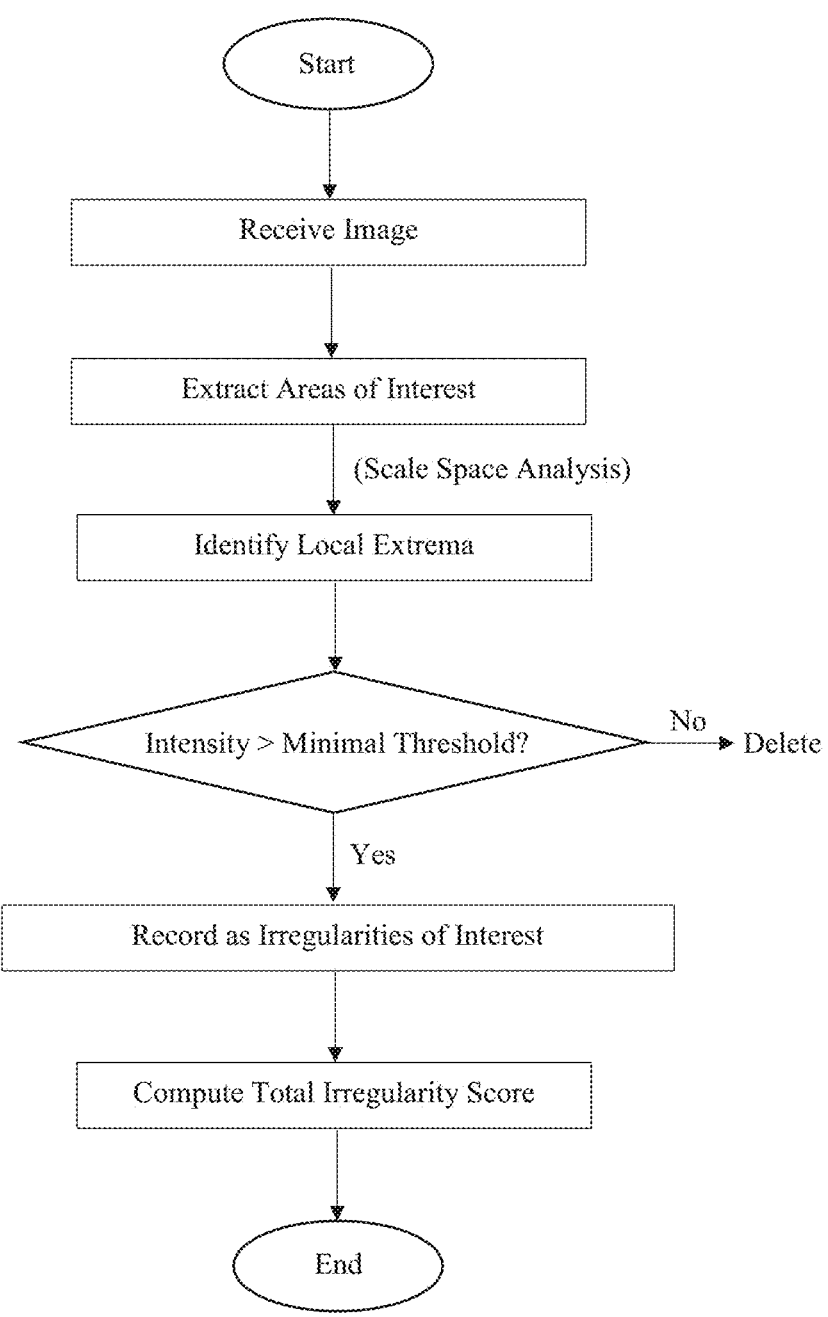
FIG. 2 is a flow diagram illustrating a method for evaluating irregularities of interest in a digital image, in accordance with an embodiment of the present invention.

FIG. 2 is a flow diagram illustrating a method for evaluating irregularities of interest in a digital image, in accordance with an embodiment of the present invention. Specifically, a digital image that potentially contains one or more irregularities of interest is first received at the start of this method. Next, an area of interest is extracted from the received digital image by removing background areas. Subsequently, scale space analysis is conducted on the extracted area of interest to identify local extrema (i.e., each local extremum represents a local maximum or minimum and has a specific intensity and a specific scale/size), followed by selection of extrema having intensities above a minimal threshold value from the identified extrema and to record such as irregularities of interest. Note that the steps of extrema selection and recordation as shown in FIG. 2 are repeated for each local extremum identified by the scale space analysis. A total irregularity score is then calculated using a function of the intensities and scales of all recorded irregularities of interest. Such total irregularity score can be used for evaluating irregularities of interest in the received digital image.

Image Capturing and Inputting

As used herein, the term "image" refers to still images and pictures as well as any frames in a video sequence. The image may be captured by any suitable image capturing devices, such as image sensors and/or analog-to-digital converters, to obtain a digital captured image. Image sensors such as charge-coupled devices (CCD) and complementary metal semiconductors (CMOS) may convert either visible or invisible light into electrons, which may form an analog signal that is then converted into digital values by an analog-to-digital converter. Corresponding, the image may be captured in a digital format as a plurality of pixels with corresponding color, illumination, and/or other characteristics.

The digital image can capture light in the visible spectrum, e.g., in the red/green/blue (RGB) space. Alternatively, such digital image can capture light in the invisible spectrum, e.g., in the UV/VIS/NIR/SWIR/MWIR/LWIR ranges (hereinafter "hyperspectral images"). Further, such digital image can capture any other electromagnetic radiations, such as those from X-ray diffraction, nuclear magnetic resonance (NMR), and the like. Preferably, chemical speciation information can be extracted from such hyperspectral images for further analysis.

In a specific embodiment of the present invention, a liquid consumer product composition is formed in situ by sequentially filling two liquid feed compositions of different colors into a transparent container, e.g., a transparent plastic bottle. The transparent plastic bottle is then fitted into a rigid and non-transparent frame, both of which are then placed inside a dark room facing a digital camera, while a LED light is placed behind such plastic bottle to provide illumination that shines through the plastic bottle into the camera. The camera captures a colored digital image of such liquid consumer product composition in the transparent plastic bottle, which is then analyzed according to the ensuring disclosure.

Image Extraction

The first step of the image analysis is to extract an area of interest from the captured digital image, e.g., by removing any irrelevant background areas. For example, if the captured digital image includes a transparent bottle that is partially filled with a liquid consumer product, the area of interest is then the region inside the bottle where the liquid consumer product is, while excluding the background area outside of the bottle and the empty headspace area in the bottle.

There are two alternative approaches for extracting areas of from the captured digital image, depending on the level of contrast between the area of interest and the background areas. For high contrast images, i.e., the contrast between the area of interest and the background is high and relatively uniform, then an un-assisted edge identification method can be used. For low contrast images, i.e., the contrast between the area of interest and the background is poor (e.g., due to poor illumination of the bottle, or due to poor mixing so that significant internal contrasts appear also inside the bottle), an assisted edge identification method can be used.

The un-assisted edge identification method relies only on image segmentation to separate the area of interest from the background areas, and it may include the following steps:

Optionally, convert the captured colored digital image to grayscale before subsequent processing. Alternatively, the captured colored digital image is processed as follows across all 3 color channels of the RGB color space;

Smooth the digital image with a Gaussian filter;

Apply the Sobel edge filter, in X and Y directions, and calculate the absolute sum to enhance image edges;

Threshold the Sobel edge image to a specific percentage of the maximum value (as defined by the user, e.g., 1-10% or 2-5%). This is done to avoid certain innate variability in the edge intensity in different parts of the bottle;

Perform a contour detection algorithm to detect the bottle contour and preferably select only contours having a sufficiently large internal area. For example, if the area of the liquid-filled section of the bottle in the image is known, a minimal area requirement equal to at least ¼ of the known area of the liquid-filled section can be imposed to select only contours with internal areas that meet this minimal area requirement and to eliminate noises resulted from smaller contours; and Typically, there is only one contour that stands out versus the background (i.e., highest intensity or highest contrast against the background), which is then selected as the area of interest.

The assisted edge identification method includes similar steps as mentioned hereinabove, except that the known contour of an area of interest is provided to assist the edge identification. For example, the known contour of a bottle is leveraged to build a projected bottle contour, which is then used as a convolution kernel in a Hough-like approach to identify the best matching bottle contour from the image with enhanced edges generated by application of the Sobel edge filter as mentioned hereinabove. Next, the maximum point in the convoluted image is detected, which represents the best matching point, hence the positions of the contour in the image. Finally, the best matching bottle contour is used to extract the area of interest from within the captured digital image of the bottle.

Figure 3A:
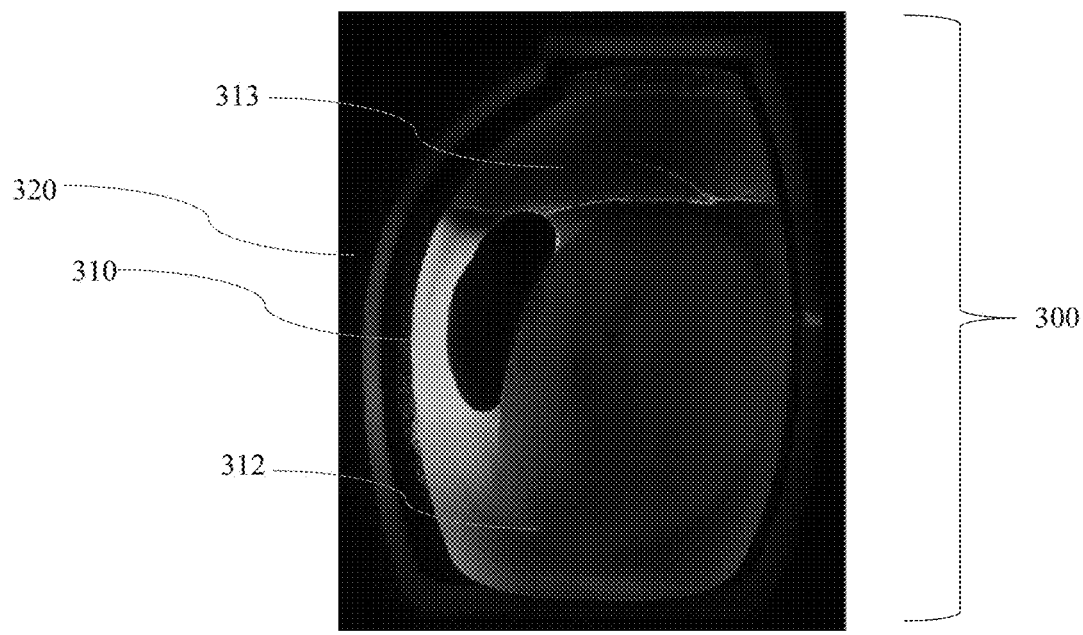
Figure 3B:
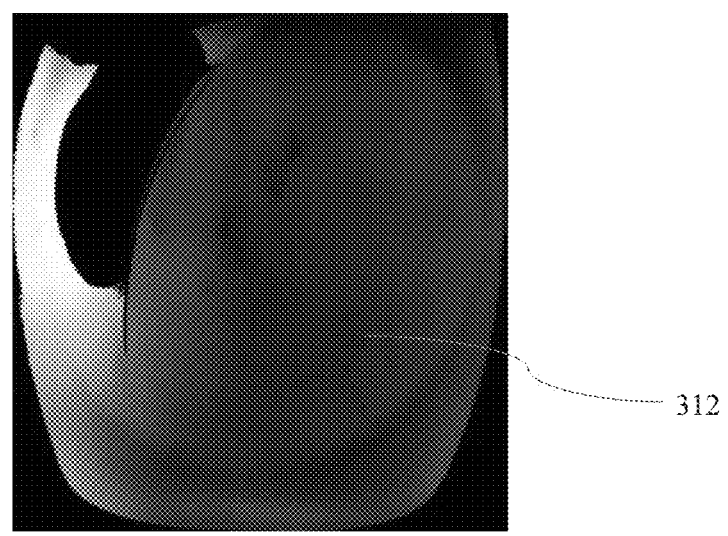
FIG. 3B is an extracted section from the digital image of FIG. 3A showing only contour of the liquid mixture, in accordance with an embodiment of the present invention.

FIG. 3A shows a greyscale digital image 300 of an illuminated transparent bottle 310 (with a handle) that is partially filled by a liquid mixture. Dark background areas 320 surrounds the illuminated transparent bottle 310, which includes a liquid-filled region 312 and an empty headspace region 313. Only the liquid-filled region 312 is of interest to the non-homogeneity evaluation of the present invention. Therefore, the first step in the image analysis is to digitally extract the liquid-filled region 312 from the digital image 300, while excluding the dark background areas 320 and the empty headspace region 313. FIG. 3B exemplifies an area of interest extracted from the digital image of FIG. 3A, i.e., the liquid-filled region 312 showing only contour of the liquid mixture, in accordance with the above-described unassisted edge identification method.

Figure 3C:
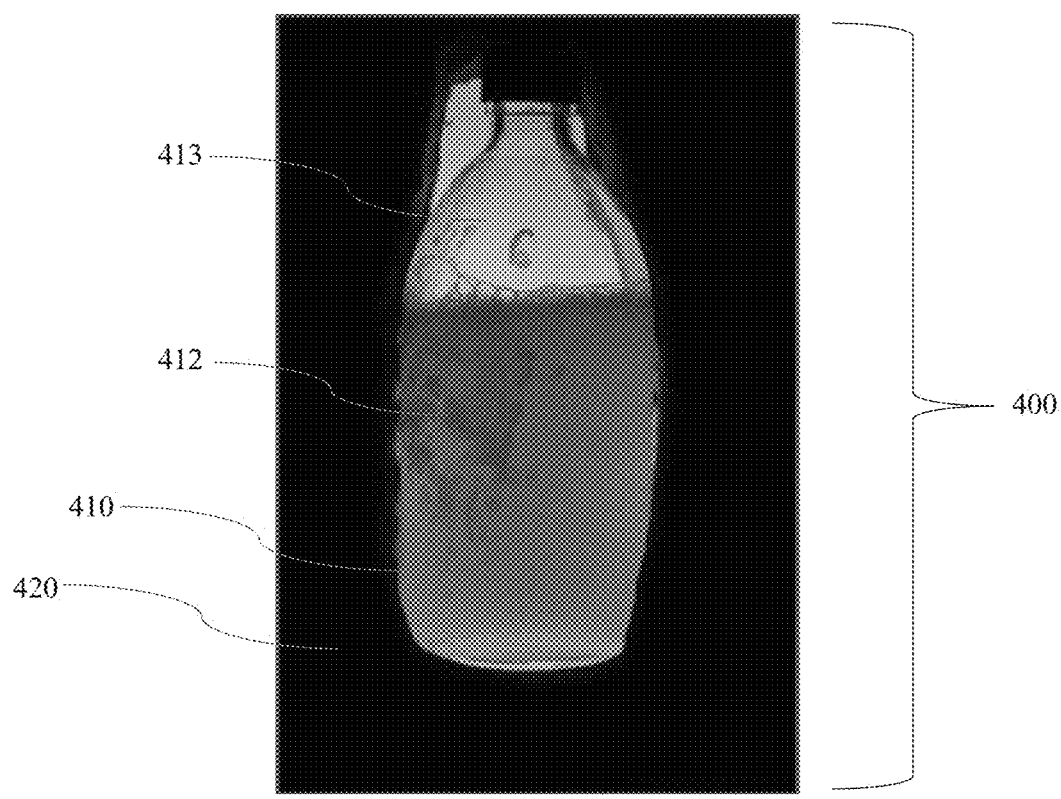
Figure 3D:
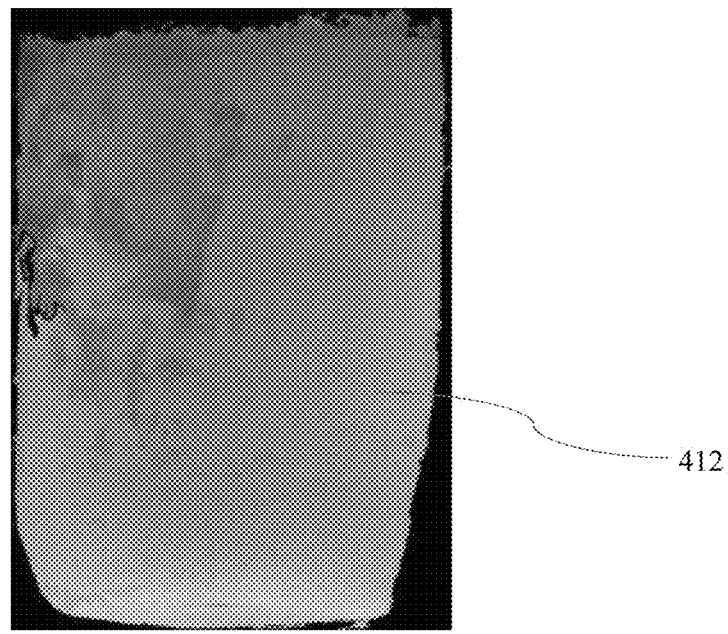
FIG. 3D is an extracted section from the digital image of FIG. 3D showing only contour of the liquid mixture, in accordance with an embodiment of the present invention.

FIG. 3C shows another greyscale digital image 400 of another transparent bottle 410 (handleless) that is partially filled by a liquid mixture. Dark background areas 420 surrounds the illuminated transparent bottle 410, which includes a liquid-filled region 412 and an empty headspace region 413. Only the liquid-filled region 412 is of interest to the non-homogeneity evaluation of the present invention. Therefore, the liquid-filled region 412 is digitally extracted from the digital image 400 by using the unassisted edge identification method as described hereinabove, while the dark background areas 420 and the empty headspace region 413 are excluded. FIG. 3D shows the digitally extracted liquid-filled section 412 from the digital image 400 of FIG. 3D, which shows only contour of the liquid mixture, in accordance with the present invention.

Scale Space Analysis and Extrema Identification

The extracted area of interest is then subjected to image analysis for detecting and identifying features therein that are indicative of irregularities of interest, e.g., subtle, non-homogeneous mixing spots or regions in a liquid mixture that is formed by two or more liquid compositions of different ingredients, colors, viscosities, and/or solubility (e.g., hydrophobicity or hydrophilicity). Preferably, such irregularities of interest are detected and identified regardless of variations in illumination, color, image noise (e.g., bubbles in the liquid mixture or subtle color/light difference due to the bottle shape), rotation, scaling, and/or small changes in viewpoint.

Several algorithms have been developed to perform feature detection in digital images. A first step towards detection of particular objects in an image is classifying the queried object based on its local features. The goal is to identify and select features that are invariant and/or robust to, for example, illumination, image noise, rotation, scaling, and/or small changes in viewpoint. Scale Invariant Feature Transform (SIFT) is one approach for detecting and extracting local features that are reasonably invariant to changes in illumination, image noise, rotation, scaling and/or small changes in viewpoint. Alternative algorithms for feature detection and subsequent feature description generation, including Speed Up Robust Features (SURF), Gradient Location and Orientation Histogram (GLOH), Local Energy based Shape Histogram (LESH), Compressed Histogram of Gradients (CHoG), among others, may also be employed.

Scale space representation technique from the SIFT algorithm is particularly preferred for analyzing the extracted area of interest of the present invention. Specifically, the extracted area of interest is convoluted with a Gaussian convolution kernel, to build a multi-scale representation of the extracted area of interest by varying the sigma (Standard Deviation) value at each step of a fixed amount. For example, starting with an initial sigma value=1.6, it is multiplied by a constant value ("Sigma Factor") in each step. In this manner, a pyramid of derivative images (i.e., derived from the extracted area of interest), each more blurred (i.e., smoothened) than the preceding one ("Gaussian Pyramid") and each being separated from the preceding one by a constant factor in scale space, are built.

A difference of Gaussian (DoG) pyramid can be constructed by computing the difference between any two consecutive Gaussian-blurred derivative images in the Gaussian Pyramid mentioned hereinabove. In this manner, a digital image can be transformed into local features that are robust or invariant to translation, rotation, scale, and/or other image parameters and/or distortion. From the scale space theory, it is known that DoG is an approximation of the Laplacian operator, which can be used for detection of local extrema (minimal or maximal values). Specifically, each "blob" or local region in the DoG space is defined as a 3×3 pixel region. Local extrema (with local maximal or minimal DoG values) can be found by comparing each of such pixel with its eight neighboring pixels at the same scale and with the nine neighboring pixels in each of the neighboring scales on the two sides of the specific pixel, i.e., with a total of 26 neighboring pixels. If the DoG value of a specific pixel is a maximum or minimum among its 26 neighboring pixels, then it is identified as a local extremum. Each of the identified local extrema may be identified by the characteristics of the "blob" or local region surrounding it, e.g., a specific intensity (i.e., the absolute minimal or maximal DoG value), a specific scale (i.e., the size of the "blob" or local region), a specific location, and/or a specific curvature.

Figure 4:
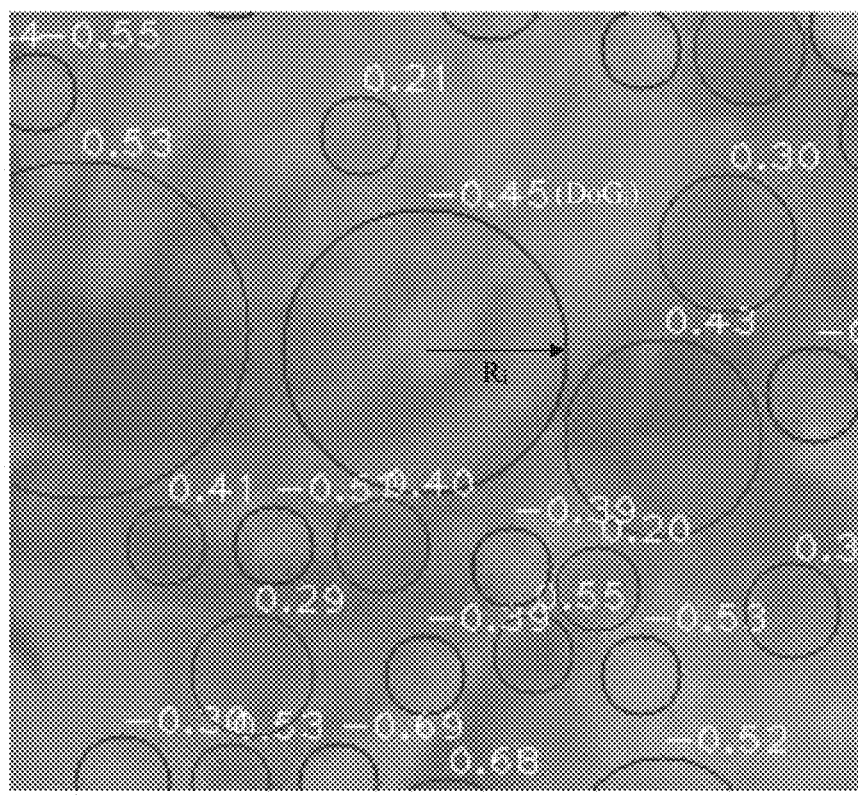
FIG. 4 is a view illustrating identified local extrema in a section of a digital image. Specifically, each local extremum is highlighted by a circle whose radius is indicative of its size or scale and is associated with a number that is indicative of its intensity (DoG).

FIG. 4 is a view illustrating "blob" or local region surrounding identified local extrema in one section of a digital image. Specifically, each local extremum is highlighted by a circle whose radius is indicative of the size or scale of the "blob" surrounding it and is associated with a number that is indicative of its intensity (i.e., the minimal or maximal DoG value).

From this population of local DoG extrema, the ones having intensities above a minimal threshold value (as indicated by the user), and optionally also having sizes above a minimal threshold value or curvatures below a maximum curvature value, are selected. This is done to avoid small scale noises and to reject edge points.

Total Irregularity Score Calculation

Once the population of DoG extrema (i.e., "irregularities of interest") have been selected according to the above description, a total irregularity score can be calculated as a function of the characteristics of all the "blobs" or local regions surrounding all the selected local DoG extrema. In the context of liquid mixtures, this total irregularity score correlates with the overall mixing result achieved, i.e., how good the mixing is.

In one specific embodiment of the present invention, the total irregularity score is calculated using a function of the intensities and scales of all recorded irregularities of interest, i.e., function (1):

$$\text{Score} = \sum_{i=1}^{n} f(Intensity_i, Scale_i) \quad (1)$$

wherein i refers to each of the recorded irregularities of interest; and n refers to the total number of recorded irregularities of interest i.

In another specific embodiment of the present invention, the total irregularity score is calculated using a function of the intensities, scales, and locations of all recorded irregularities of interest, i.e., function (2):

$$\text{Score} = \sum_{i=1}^{n} f(Intensity_i, Scale_i, Location_i) \quad (2)$$

wherein i refers to each of the recorded irregularities of interest; and n refers to the total number of recorded irregularities of interest i. Preferably, intensity value in both function (1) and function (2) is the DoG value of the selected local DoG extrema.

Further, the relative locations of recorded irregularities of interest can be used to determine the "density" or "concentration" of recorded irregularities of interest in specific regions of the extracted area of interest, and such "density" or "concentration" can be weighted into calculation of the total irregularity score. As an example, the extracted area of interest may contain three regions, A, B, and C, characterized by different "density" or "concentrations" of recorded irregularities of interest. The weighted concentration in each region A, B, or C can be calculated as the sum of the contributions from each irregularity of interest in such region divided by the total area of such region, as follows:

$$Concentration_{Region} = \frac{\sum_{i=1}^{n}(DoG_i \times Scale_i)}{Area_{Region}} \quad (2a)$$

which can then be factored into calculation of the total irregularity score using the following function (2b):

$$\text{Score} = \sum_{i=1}^{n} f(Intensity_i, Scale_i, Concentration_x) \quad (2b)$$

while x refers to the region (i.e., A, B, or C) in which the recorded irregularities of interest i is located.

In a particularly preferred embodiment of the present invention, the total irregularity score is calculated using the following specific function (3):

$$\text{Score} = \frac{\sum_{i=1}^{n} (|DoG_i| \times \pi \times R_i^2)}{W \times H} \quad (3)$$

while i refers to each of the recorded irregularities of interest; n refers to the total number of recorded irregularities of interest i; $R_i$ refers to the radius of each of the recorded irregularities of interest i; W refers to the width of the extracted area of interest; and H refers to the height of the extracted area of interest.

The above-mentioned specific function (3) assumes a circular shape for the recorded irregularities of interest (i.e., the scale/size of which is therefore calculated as $\pi \times R^2$), and a rectangular shape for the extracted area of interest (i.e., the size of which is therefore calculated as W×H). However, the recorded irregularities of interest and the extracted area of interest may have any other shapes, and other specific functions can then be employed to calculate the total irregularity score accordingly. For example, if the recorded irregularities of interest have a square shape, then the scale/size of such will be calculated as $A^2$, while A refers to the length of each side of such square; if the extracted area of interest has a circular shape, then the size of it should be calculated as $\pi \times R^2$, while R refers to the radius of the extracted area of interest. Correspondingly, the total irregularity score for such square-shaped recorded irregularities of interest and circular-shaped extracted area of interest can be calculated using the following specific function (3a):

$$\text{Score} = \frac{\sum_{i=1}^{n} (|DoG_i| \times A_i^2)}{\pi \times R^2} \quad (3a)$$

while i refers to each of the recorded irregularities of interest; n refers to the total number of recorded irregularities of interest i; $A_i$ refers to the length of each side of the square-shaped recorded irregularities of interest i; and R refers to the radius of the circular-shaped extracted area of interest.

Further, the recorded irregularities of interest may have irregular shapes, which can be readily detected by edge identification methods described hereinabove, and the areas of such irregular shapes can then be calculated using well-known approximation and/or calculus algorithms or methods, or various built-in area-calculation tools in GIS and CAD packages.

The functions as described hereinabove work well when the digital image analyzed is a colored image in the visible spectrum, which is first converted to greyscale before the image extraction step. The corresponding intensity or DoG value is the greyscale intensity or DoG value of each selected local extremum. Correspondingly, the total irregularity score so calculated in the liquid mixture context represents overall variations in the luminosity of adjacent pixels in the grayscale level, without taking color variations into consideration.

However, when there are significant color variations that need to be taken into consideration, it may be necessary to eliminate the greyscale conversion step and to conduct scale space analysis on the colored image in each color channel of a selected color model or space, e.g., RGB, CYMK, HSL, or HSV, and to calculate a total irregularity score using a function of intensities, scales, and locations of all selected local DoG extrema across all color channels of the selected color model or space. For example, when the selected color model is RGB, the total irregularity score is calculated as the sum of 3 contributions across the 3 color channels (i.e., Red, Green, and Blue) of the RGB color space, as function (4):

$$\text{Score} = \sum_{i=1}^{n} f_{Red}(IT_i^R, SL_i^R, LC_i^R) + \sum_{j=1}^{m} f_{Green}(IT_j^G, SL_j^G, LC_j^G) + \sum_{k=1}^{l} f_{Blue}(IT_l^B, SL_l^B, LC_l^B) \quad (4)$$

while i refers to the recorded irregularities of interest in the red channel; n refers to the total number of recorded irregularities of interest i in the red channel; j refers to the recorded irregularities of interest in the green channel; m refers to the total number of recorded irregularities of interest j in the green channel; k refers to the recorded irregularities of interest in the blue channel; l refers to the total number of recorded irregularities of interest k in the blue channel; IT refers to the color intensity of each recorded irregularity of interest in the respective color channel; SL refers to the scale of each recorded irregularity of interest in the respective color channel; and LC refers to the location of each recorded irregularity of interest in the respective color channel More preferably, IT in the above-mentioned function (4) can be the DoG value of the selected local DoG extrema.

Mixing Results Evaluation

The total irregularity score as calculated from functions described hereinabove can be used to evaluate irregularities of interest in the digital image. In the liquid mixture context, the total irregularity score indicates how good the overall mixing result is, and can be used to compare the homogeneity of two different liquid mixtures formed by using different liquid raw materials or different mixing techniques or equipment.

The above-described image processing method has been validated by using a test set of digital images that show transparent bottles containing liquid mixtures of various degrees of mixing. A total irregularity score is calculated for each of the test images by using the image processing method described hereinabove, and is then compared with visual evaluations of such test images. A linear correlation is observed between the total irregularity scores calculated in accordance with the present invention and the visual evaluation scores.

Optimizations in the Liquid Mixture Context

Users of the present method can choose to eliminate from the calculation any objects of a specific shape and size. In the context of liquid mixtures, the liquid mixtures may be aerated and therefore the digital image of such liquid mixtures may include many small air bubbles. These air bubbles may be detected as local extrema representative of local irregularities of interest by the scale space analysis of the present invention. Correspondingly, the DoG values or intensities of these air bubbles may contribute to the total irregularity score calculated. However, such air bubbles do not indicate poor mixing and may need to be excluded from the calculation of the total irregularity score. Therefore, it is preferred to add a rejection algorithm that identifies such air bubbles and subtracts their contributions from the total irregularity score. Air bubbles are typically spherical in shape and very small. Correspondingly, such air bubbles may appear on the captured digital image as small circles with a diameter less than 4 mm, preferably less than 3 mm, and more preferably less than 1 mm Therefore, any objects with such shapes and sizes can be selected, and their contributions can be eliminated from the calculation of the total irregularity score.

Specifically, the rejection algorithm may include the following steps:

For each irregularity of interest ("object") identified by the scale space analysis described hereinabove, extract a sub-image that centers around the identified object and has a dimension of 3λ the scale of the identified object. Such sub-image can be a square image, with each side of the square being 2*3λ the scale of the identified object.

Segment this sub-image using a local optimal threshold method, e.g., Otsu's method.

Run a contour identification procedure to extract a contour that describes the object contained by the sub-image.

Fit a rotated ellipsoid on this contour, and calculate the eccentricity of the fitted ellipsoid.

Because air bubbles are typically perfectly circular (with an eccentricity near 0), it is desirable to reject all objects with contours having an eccentricity higher than a specific value set by the user (e.g., 0.6). Further, because air bubbles are typically very small, it is also desirable to reject all the objects with contours having sizes smaller than a specific value set by the user (e.g., a diameter less than about 4 mm, preferably less than about 3 mm, and more preferably less than about 1 mm).

For all the rejected objects (i.e., air bubbles), their contributions to the total irregularity score are correspondingly excluded or eliminated.

Further, there may be situations in the liquid mixture context where the container design results in certain innate visual irregularities, but which are not indicative of poor mixing results. In other words, a perfectly mixed liquid product placed in such container may still show a relatively high total irregularity score due to the innate visual irregularities imparted by the container design. The contribution of such innate visual irregularities to the calculation of the total irregularity score may be treated as a baseline shift, i.e., which will always be there, and which therefore can be subtracted from the total irregularity score. For example, a baseline image of the container can be provided and processed by a visual projection method to determine the contribution of such container design, i.e., local extrema identified from the baseline image, and such contribution can then be excluded or eliminated from the total irregularity score calculation.

Implementation of the Image Processing Method

The image analysis or processing methods as described hereinabove can be embodied as computer programs executable through various computer devices and can be recorded in a non-transitory processor-readable medium. The processor-readable medium may include a program instruction, a data file, a data stream, and a data structure or a combination thereof.

The program instruction recorded in the computer readable medium may be specially designed for the present invention or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMs), and flash memories. In addition, the above described medium maybe a transmission medium such as light including a carrier wave transmitting a signal specifying a program instruction and a data structure, a metal line and a wave guide. The program instruction may include a machine code made by a compiler, and a high-level language executable by a computer through an interpreter.

The above described hardware device may be constructed to operate as one or more software modules to perform the operation of the present invention, and vice versa. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

EXAMPLES

Figure 5:
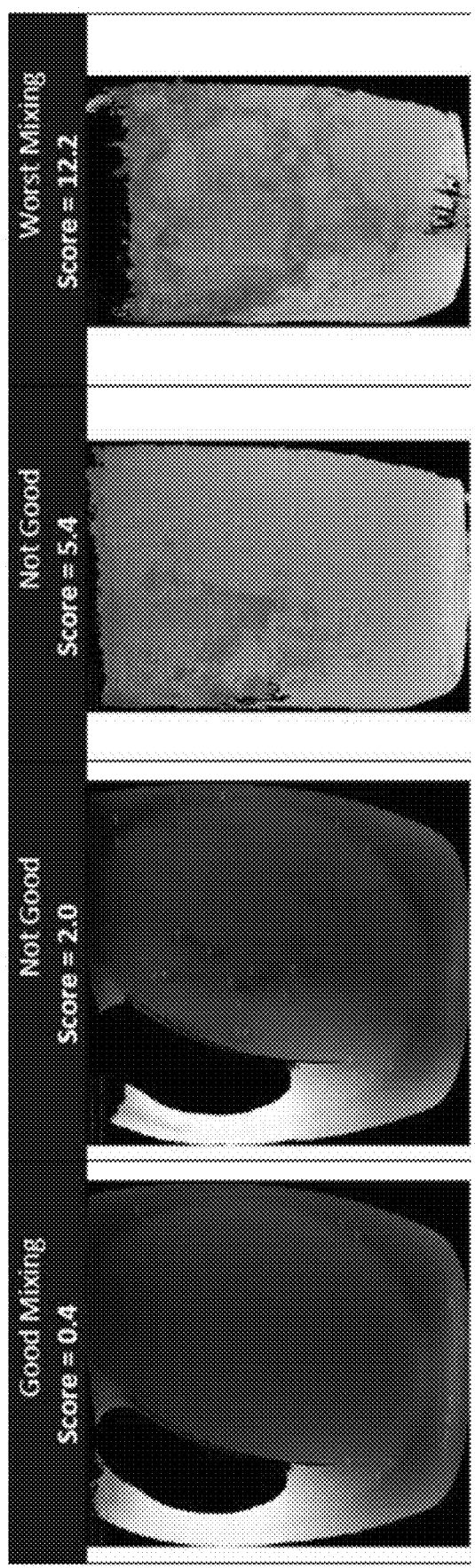
FIG. 5 shows digital images of four (4) different liquid mixtures of different mixing homogeneity, and their associated total irregularity scores as calculated by the inventive method of the present invention.

FIG. 5 shows digital images of four (4) different liquid mixtures of different mixing homogeneity, and their associated total irregularity scores as calculated by the inventive method of the present invention, using the following parameters:

TABLE I

| | |
|---|---|
| Contour Threshold Percentage | 2% |
| Space Scale steps | 10 |
| Initial Sigma for scale space | 2.5 |
| Minimum detection scale | 5 |
| Minimum DoG Value for extrema | 0.05 |
| Maximum curvature for extrema | 30 |

Obvious correlation is observed between the total irregularity scores calculated in accordance with the present invention and the mixing homogeneity visually observed from the digital images shown in FIG. 5.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method operational in an image processing device for evaluating irregularities of interest in a digital image, comprising the steps of:
    (a) receiving a digital image that potentially comprises irregularities of interest;
    (b) extracting an area of interest from said digital image by removing background areas;
    (c) conducting scale space analysis of the extracted area of interest to identify extrema each representing a local maximum or minimum, wherein each extremum has a specific intensity and is of a specific scale;
    (d) selecting extrema having intensities above a minimal threshold value from the identified extrema and recording such as irregularities of interest;
    (e) calculating a total irregularity score using a function of the intensities and scales of all recorded irregularities of interest; and
    (f) evaluating irregularities of interest in the digital image using the calculated total irregularity score.

2. The method of claim 1, wherein calculating the total irregularity score comprises using function (1):

$$\text{Score} = \sum_{i=1}^{n} f(\text{Intensity}_i, \text{Scale}_i) \tag{1}$$

wherein i refers to each of the recorded irregularities of interest; and n refers to the total number of recorded irregularities of interest i.

3. The method of claim 1, wherein calculating the total irregularity score comprises using function (2):

$$\text{Score} = \sum_{i=1}^{n} f(\text{Intensity}_i, \text{Scale}_i, \text{Location}_i) \tag{2}$$

wherein i refers to each of the recorded irregularities of interest; and n refers to the total number of recorded irregularities of interest i.

4. The method of claim 1, wherein in step (b), the background areas are removed and the area of interest is extracted by using an edge identification method.

5. The method of claim 4, wherein in step (b), the edge identification method comprises the steps of first applying a Sobel edge filter to the image, then thresholding, and followed by contour detection and selection.

6. The method of claim 1, wherein in step (c), the scale space analysis comprises:
    (i) convoluting the extracted area of interest with a Gaussian kernel to build a multi-scale representation of the extracted area of interest that comprises a series of derivative images of the extracted area of interest, each being more blurred than a preceding image and each being separated from the preceding image by a constant factor in scale space;
    (ii) computing the difference of Gaussian (DoG) between each two consecutive derivative images of the extracted area of interest from step (i); and
    (iii) identifying extrema having a local maximal or minimal of DoG,
    wherein the intensity of each extremum is its absolute DoG value, and wherein the scale of each extremum is its size.

7. The method of claim 6, wherein calculating the total irregularity score comprises using function (3):

$$\text{Score} = \frac{\sum_{i=1}^{n} (|DoG_i| \times \pi \times R_i^2)}{W \times H} \tag{3}$$

wherein i refers to each of the recorded irregularities of interest; n refers to the total number of recorded irregularities of interest i; $R_i$ refers to the radius of each of the recorded irregularities of interest i; W refers to the width of the extracted area of interest; and H refers to the height of the extracted area of interest.

8. The method of claim 1, wherein said digital image represents a liquid mixture formed by mixing two or more liquid compositions of different colors, viscosities, and/or hydrophobicity/hydrophilicity, and wherein said irregularities of interest represent regions in the liquid mixture where mixing is non-homogenous.

9. The method of claim 1, wherein the digital image is a colored image in the visible spectrum, and wherein the colored image is first converted to grayscale before the area extraction in step (b), and wherein the intensity of each identified extremum is its grayscale intensity.

10. The method of claim 1, wherein the digital image is a colored image in the visible spectrum, wherein the area extraction in step (b) and the scale space analysis in step (c) are conducted on the colored image in each color channel of a color model selected from the group consisting of RGB, CYMK, HSL, and HSV, and wherein the total irregularity score is calculated using a function of intensities, scales and locations of all recorded irregularities of interest in all color channels of said color model or space.

11. The method of claim 10, wherein the color model is RGB, and wherein calculating the total irregularity score comprises using function (4):

$$\text{Score} = \sum_{i=1}^{n} f_{Red}(IT_i^R, SL_i^R, LC_i^R) + \sum_{j=1}^{m} f_{Green}(IT_j^G, SL_j^G, LC_j^G) + \sum_{k=1}^{l} f_{Blue}(IT_l^B, SL_l^B, LC_l^B) \tag{4}$$

wherein i refers to the recorded irregularities of interest in the red channel; n refers to the total number of recorded irregularities of interest i in the red channel; j refers to the recorded irregularities of interest in the green channel; m refers to the total number of recorded irregularities of interest j in the green channel; k refers to the recorded irregularities of interest in the blue channel; l refers to the total number of recorded irregularities of interest k in the blue channel; IT refers to the color intensity of each recorded irregularity of interest in the respective color channel; SL refers to the scale of each recorded irregularity of interest in the respective color channel; and LC refers to the location of each recorded irregularity of interest in the respective color channel.

12. The method of claim 1, wherein calculating the total irregularity score comprises eliminating contributions from:
   (i) selected extrema of a predetermined shape and/or size; and/or
   (ii) selected extrema that are also present in a baseline image.

13. A non-transitory processor-readable medium having stored thereon instructions which when executed by a computing device or system cause said computing device or system to perform the method according to claim 1.

14. An image processing device for evaluating irregularities of interest in a digital image, comprising:
   (a) an image input unit configured to receive a digital image that potentially comprises irregularities of interest;
   (b) an image extraction unit configured to extract an area of interest from said digital image by removing background areas;
   (c) a scale space analysis unit configured to conduct scale space analysis of the extracted area of interest and to identify extrema each representing a local maximum or minimum, wherein each extremum has a specific intensity and is of a specific scale;
   (d) an irregularity selection unit configured to select extrema of a minimal intensity from the identified extrema and to record such as irregularities of interest;
   (e) an irregularity score calculating unit configured to calculate a total irregularity score using a function of the intensities and scales of all recorded irregularities of interest; and
   (f) an output unit for outputting the calculated total irregularity score for use in evaluation of irregularities of interest in the digital image.

* * * * *